Aug. 28, 1962     E. H. MAGESTER     3,051,455
MIXING NOZZLE
Filed July 25, 1960
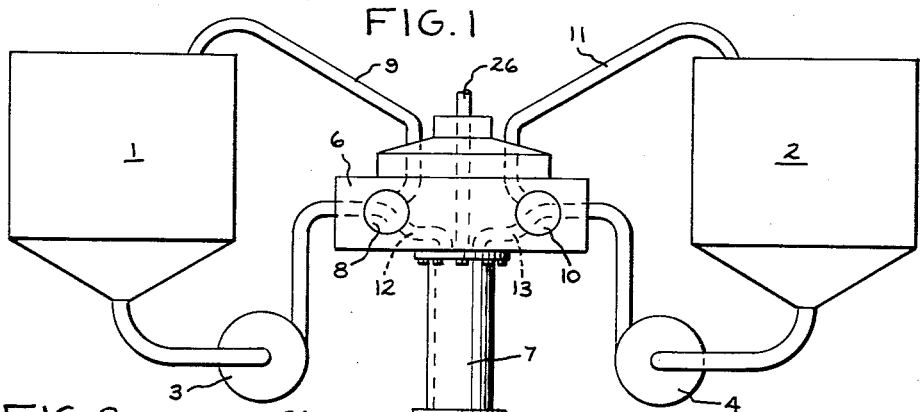
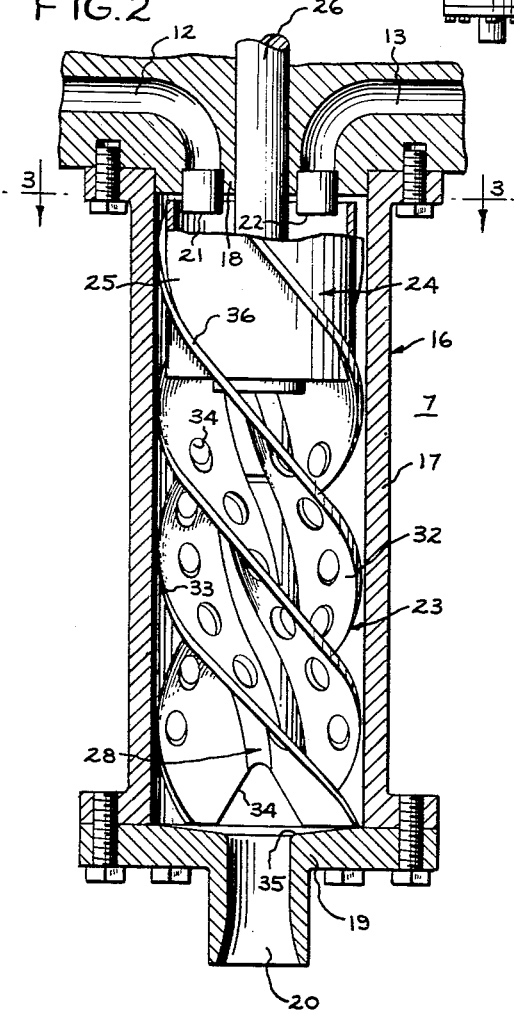
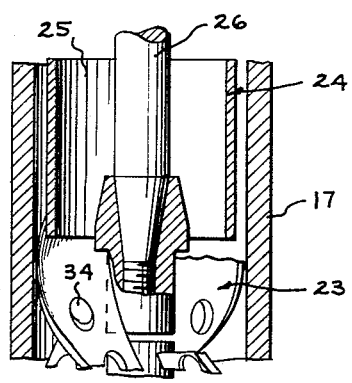
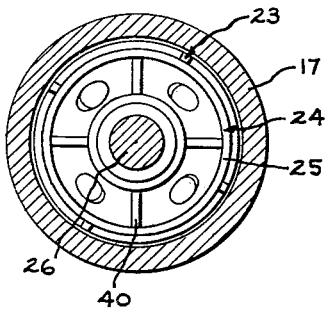
INVENTOR.
EARL H. MAGESTER
BY
HIS ATTORNEY United States Patent Office 3,051,455
Patented Aug. 28, 1962

3,051,455
MIXING NOZZLE
Earl H. Magester, Louisville, Ky., assignor to General Electric Company, a corporation of New York
Filed July 25, 1960, Ser. No. 44,941
1 Claim. (Cl. 259—8)

The present invention relates to mixing or blending nozzles and is particularly concerned with an improved apparatus of this type for mixing or blending separate streams of resin-forming components including a vaporizable liquid adapted to produce a resinous foam upon concurrent reaction of the resin-forming components and vaporization of the vaporizable liquid.

In the manufacture of cellular structures from resin-forming ingredients containing a vaporizable liquid as a foam producing or blowing agent, it is the usual practice to provide a freshly mixed mixture of the resin-forming ingredients or components including a foam producing agent and to introduce the resultant mixture as quickly as possible into a mold or other container in which the liquid reaction mixture foams and sets. For the production of a foam of uniform density, it is essential that the various components of the foam producing composition be thoroughly and completely mixed as quickly as possible and the resultant mixture introduced into the mold or other container immediately after mixing in order to obtain an even and uniform distribution of the reaction mixture throughout the mold or container before the mixture starts to foam and set. Since it is desirable to complete the charging of the mold or other container with the required amount of foam producing material before any substantial foaming thereof takes place, the rate at which the foam producing components must be mixed and introduced into the mold, that is the pouring rate, will vary with different size molds. For example, the charging of the relatively small molds such as the small refrigerator door with a foam producing resin mixture may require a pour rate of only 10 pounds per minute whereas the charging of the larger mold such as a large refrigerator door with the same resinous material may require a higher pour rate of for example 30 pounds per minute. In either case it is essential that the mixing nozzle employed for mixing the resin-forming ingredients including the foaming or blowing agent be capable of thoroughly mixing the separate streams of resin-forming ingredients or components at the rate at which they are brought together in the nozzle and the resultant mixture introduced into the mold. In other words, mixing must be completed within the time any given increment of the materials being mixed remains within the nozzle.

Furthermore, whenever the mixing and charging apparatus is employed intermittently for the charging of individual molds with foamable mixtures, it is desirable that the nozzle be self-clearing following each on or charging cycle as otherwise the reactive ingredients remaining in the nozzle during an off cycle, that is, while a charged mold is being replaced by an empty one, will tend to foam and set, thus rendering the nozzle inoperative unless it is flushed following each operation with a suitable solvent for the resin-forming or resinous material. Presently available mixing nozzles of the "on-off" type for providing intermittently foamable resinous compositions such as foamable polyurethane resins including a vaporizable liquid blowing agent will not thoroughly mix the components over a wide range of pouring speeds. Present practices therefore require the use of different capacity nozzles for different pouring speeds or rates thus requiring a change in nozzles whenever there is a substantial change in the size of the molds being charged. A further requirement for a mixing nozzle which is to be employed in the mixing of a foam producing mixture including a vaporizable liquid as the blowing agent is that the ingredients should be mixed in such a manner that the vaporizable liquid is not released from the mixture either as a result of an increase in temperature or excessive agitation within the nozzle during the mixing operation.

Because a mixing nozzle for the intermittent or "on-off" production of a foamable resin mixture must be self-clearing or cleaning after each on cycle, the principal emphasis has been placed on the cleaning problem with the result that such nozzles have included spiral rotors or conveyor elements designed primarily as pumps which incorporate means for mixing the material pumped through the nozzles. As a general result, any given nozzle has been capable of providing the desired mixing action over only a limited pouring rate range matching rather closely its pumping capacity thus requiring a change in nozzles for different pouring rates.

A primary object of the present invention is to provide a mixing nozzle adapted to thoroughly and completely mix separate streams of foam producing resin-forming components over a broad range of pouring rates.

Another object of the present invention is to provide a self-clearing or draining mixing nozzle particularly adapted for the mixing of separate streams of resin-forming ingredients including a vaporizable liquid foam producing agent.

A further object of the invention is to provide a mixing nozzle designed to thoroughly mix separate streams of resin-forming ingredients including a vaporizable liquid foaming agent and to discharge the resultant mixture in the form of a smooth, rod-like stream.

Further objects and advantages of the invention will become apparent as the following description proceeds and the features of novelty which characterize the invention will be pointed out with particularity in the claim annexed to and forming part of this specification.

In accordance with the present invention there is provided a mixing nozzle for mixing separate streams of resin-forming components including a vaporizable foam producing agent and for discharging the resultant mixture in the form of a single rod-shaped smooth stream, which nozzle comprises a vertical completely cylindrical housing or sleeve including a top wall through which the separate streams are introduced into the housing at points spaced from the cylindrical housing wall. A rotatable mixing impeller provided within the housing comprises an upper cup-shaped portion including a solid cylindrical side wall spaced from the housing cylindrical wall for receiving the streams from the inlet openings and a spiral lower portion for mixing the streams and advancing the mixture towards an outlet provided in the bottom of the housing. To obtain the desired mixing action over a wide or broad throughput range, the spiral lower portion of the impeller comprises a relatively small number of helical blades of substantial pitch and having their outer edges in sliding or cleaning engagement with the housing cylindrical wall. To increase the capacity of the nozzle, each of the blades includes spaced openings along the lengths thereof and between the axis of the impeller and the outer edges of the blades for permitting portions of the ingredients being mixed to pass through the blades during rotation of the impeller. In order that the mixed material will be discharged from the nozzle in a rod-like stream from an outlet axially positioned in the bottom housing wall, the inner portions of the lower ends of each of the blades are relieved to form an axially-positioned conical recess in the lower end of the impeller above the outlet whereby portions of the mixed material will flow into this recess as it flows toward the outlet opening and will thus no longer be subject to the rotating action of the blades immediately preceding the passage thereof through the outlet opening. The cylindrical upper portion of the mixing impeller is designed to confine the incoming streams so that they flow onto the central or inner upper edge portions of the helical blades as the impeller rotates. These edge portions coming in alternate contact with the separate streams entering the nozzle "cut off" and effect the initial intermingling of small increments or slices of the separate streams.

For a better understanding of the invention reference may be had to the accompanying drawing in which:

FIG. 1 is a somewhat schematic illustration of apparatus employed in the preparation of a liquid foam producing resinous reaction mixture;

FIG. 2 is an elevational view, partly in section of the mixing nozzle of the present invention;

FIG. 3 is a sectional view of the nozzle taken along line 3—3 of FIG. 2; and

FIG. 4 is a view, in section, of a portion of the nozzle shown in FIG. 1.

With reference to FIG. 1 of the drawing there is shown somewhat schematically one form of apparatus required for the mixing, in metered proportions, of two resinous forming components, one of which includes a vaporizable liquid foaming agent, for the manufacture of a resin foam. This apparatus comprises separate reservoirs or containers 2 and separate pumps 3 and 4 for respectively circulating metered quantities of the materials stored in the containers 1 and 2 through a valve mechanism 6 which permits instantaneous diversion of the flow of the components to a mixing nozzle 7. The valve mechanism 6 includes a first three-way valve 8 which normally directs the component stored in the reservoir 1 back into the reservoir 1 through a return line 9 and a second three-way valve 10 for similarly controlling the return flow of material from the reservoir 2 through a return line 11. Movement of the valves 8 and 10 to the dotted line positions shown in FIG. 1 causes metered amounts of the components from reservoirs 1 and 2 to enter the nozzle 7 through the respective inlet lines 12 and 13. The valves 8 and 10 are normally positioned in their return or recirculating positions except when it is desired to mix a charge of the components in the nozzle 7 for introduction into a suitable mold (not shown).

The nozzle of the present invention is particularly adapted for the mixing of constituents one of which includes a vaporizable liquid. While the invention is not limited thereto, the nozzle of the present invention is particularly useful in the preparation of polyurethane foams employing a low boiling vaporizable liquid such as trichloromonofluoromethane as the foaming agent. As there are various well-known compositions which are employed for the production of such foams, it will be sufficient by way of example to mention only that in the usual method of preparing polyurethane resin foams, the catalyst will be mixed with one of the resin-forming ingredients while the vaporizable liquid or blowing agent will be mixed with the other and the two mixtures will be separately stored in the reservoirs 1 and 2. For example, a polyester component of the urethane resin plus a suitable catalyst can be stored in the reservoir 1 while a prepolymer or partial polymer obtained by reacting a polyester with a cross linking isocyanate will be stored in the reservoir 2 as a mixture with a blowing agent such as trichloromonofluoromethane.

For the intermittent or on-off operation of the mixing and feed nozzle 7, it is essential that this nozzle be of the self-clearing or self-cleaning type. In other words all of the material introduced upon the opening of the valves 8 and 10 must flow from the nozzle during each operation as any mixture which remains in the nozzle will foam and set up during the succeeding off cycle eventually plugging the nozzle and interfering with the mixing action thereof. In addition the nozzle must be constructed so that there will be no significant heat generated during the operation of the mixing component thereof which could otherwise result in the acceleration of the resin forming and foaming reactions with the undesirable results mentioned hereinbefore. Furthermore, when a vaporizable liquid is employed as a blowing or expanding agent, the two components of the reaction mixture should be mixed under conditions which do not tend to separate or vaporize the blowing agent.

The mixing nozzle of the present invention which is shown in detail in FIGS. 2, 3 and 4 of the drawing is designed to meet these requirements and to provide certain other advantages which will be described hereinafter.

The nozzle comprises a housing 16 including a cylindrical side wall 17 of uniform diameter, a top wall 18 formed by the lower surface of the valve mechanism 6 and a bottom wall 19 closing the lower end of the cylinder and including an outlet orifice 20. The components to be mixed within the nozzle 7 are introduced through the inlet conduits 12 and 13 which preferably have their tips 21 and 22 extending downwardly a short distance into the housing at points spaced inwardly from the cylindrical housing wall 17.

For the purpose of intimately mixing the foam producing constituents as they are introduced into the housing 16 during opening of the valves 8 and 10 and for the purpose of discharging all of the mixture during each mixing operation through the outlet orifice 20, there is provided an improved mixing impeller 23 extending substantially the full length of the housing 16. The upper end of the impeller 23 is suitably secured to a drive shaft 26 extending through the member 6.

The impeller 23 essentially comprises an upper cup-like portion 24 having a cylindrical side wall 25 spaced from the housing wall 16 for receiving the components introduced through the lines 12 and 13 and directing these components downwardly away from the upper portions of the housing and onto the lower spiral portion 28 of the impeller which is designed to mix the components and to discharge the mixture through the orifice 20. The spiral portion 28 is designed to intimately mix the constituents over a broad range of pouring rates and to clear the nozzle of all of the mixture following each mold charging or on cycle while operating at a relatively low speed. Since only a minimum cleaning pumping action is believed necessary for the clearing action, the impeller comprises only a few helical blades 32 each having a substantial pitch and each extending across the entire radius of the impeller. Preferably four such blades are employed and they are spaced 90° about the axis of the impeller for ease of manufacture and balancing of the impeller structure. By using a minimum number of blades having a substantial pitch, ample space is provided between the blades for containing the constituents introduced into the nozzle thus giving the nozzle a maximum capacity. In order to clear the nozzle following each charging operation, the clearance between the outer edges 33 of the blades 32 and the inner surfaces of the cylindrical wall 17 is held to a minimum and is sufficient only to prevent binding of the rotating impeller within the housing.

To provide the desired mixing ability of the impeller over a broad range of pour rates, each of the blades 32 is provided with a plurality of shear holes 34 extending through the blades in a horizontal direction that is in the plane of rotation of the blades whereby material within the nozzle will pass through these shear openings during rotation of the impeller for a more complete and uniform mixing thereof. As the material is mixed during its advance through the nozzle 7 by rotation of the impeller structure, it is given a twisting or twirling movement and in order to obtain a rod-like or straight configuration of the output stream from the orifice 20 it is desirable that the material, as it passes through the orifice 20, be substantially free of any rotational or twisting movement. For this purpose the inner or axial portions of each of the blades 32 above the orifice 20 are relieved as indicated by the numeral 34 to provide a conical recess in the lower end of the impeller into which much of the material can flow during its passage to the orifice 20. The material entering this recess is out of the path of the rotating blades and due to its viscous nature, it quickly looses much of its rotational movement so that it enters the orifice 20 in a substantially vertical non-rotating direction. Flaring the lower end of the orifice 20 as indicated in FIG. 1 of the drawing also aids in the causing the output stream to have a smooth rod-like pattern.

The advantages of the present invention will become more apparent from a consideration of the operation of the nozzle. As the two streams of material flow into the nozzle from inlet lines 12 and 13, they normally fall through the cup 24 into engagement with the rotating impeller blades. Each blade or more specifically, each upper edge 40 of these blades contacts or cuts through the alternate streams and slices off small increments thereof which overlap and intermingle on the lower surfaces of the blades before flowing outwardly to the outer edges 33 of the blades due to the centrifugal forces. It will be seen that this initial mixing of small portions of the two streams is much more effective than if the streams were permitted to flow separately and directly onto the housing side wall as with a number of the prior art mixing nozzles. At lower pour rates at which the amount of material introduced through the inlets 12 and 13 is small, most of the remaining mixing action is a shearing action on the charge between the outer edges 33 of the blades 32 and the inner surfaces of the housing. At heavier pour rates, a mixing action obtained only at the outer edges of the blades would not be sufficient since with a partially flooded nozzle, much of the charge will not reach these areas. Accordingly, the shear holes 34 are provided which permit material centrally positioned in the nozzle to pass through a plurality of the shear holes and from blade to blade thus becoming more intimately mixed. In other words with such pour rates, a substantial amount of the mixing takes place as a result of the shear holes. With maximum pour rates, the lower portions of the nozzle may become completely filled with the resin forming constituents and some of the material may back up into the cup portion 24. To prevent this backed up portion from flowing upwardly between the cup and the housing walls, the outer edge portions of the blades 32 may be extended upwardly along the outer surfaces of the cylindrical wall 25 as indicated by the numeral 36 to continuously pump any such material downwardly into the lower portions of the nozzle.

To further aid in the discharge of the material from the nozzle in a linear stream the lower wall 19 of the housing is of concave configuration as indicated by the numeral 35, this concave portion functioning in the same manner as the recess formed in the bottom portion of the impeller to permit the material to flow out of the path of the lower horizontal or flat end of the impeller and its swirling action before entering the orifice 20.

The shape and configuration of the nozzle of the present invention and particularly the substantial pitch of the mixing blades which cut through the material being mixed while advancing it at a relatively slow rate permits operation of the impeller at a relatively low rotational rate to obtain thorough mixing of the ingredients while avoiding any foaming or separation of the blowing agent during the mixing operation. For example, a single nozzle of the present invention has been used successfully to provide complete mixing of the resin-forming constituents at pour rates ranging from 10 to 40 pounds per minute with the nozzle impeller rotating at all times at 2900 r.p.m. This is a relatively slow speed compared with the recommended speeds approaching 5000 r.p.m. prescribed for presently available mixing nozzles. One advantage of low speed operation is that with a lower speed of agitation of the material being mixed, there is less increase in temperature thereof due to the mixing operation.

While there has been shown and described a particular embodiment of the present invention it will be understood that the invention is not limited to this particular form and it is therefore intended by the appended claim to cover all modifications as fall within the spirit and scope of the invention.

What I claim as new and desire to secure by Letters Patent of the United States is:

A mixing nozzle for mixing separate streams of resin-forming components including a vaporizable liquid and for discharging the resultant mixture in a single rod-like stream, said nozzle comprising a vertical housing including a bottom wall and a cylindrical side wall, inlet means at the top of said housing for introducing said streams at points spaced from the cylindrical housing side wall, a rotatable mixing impeller in said housing comprising an upper portion including a cylindrical member open at the top and bottom and spaced from said housing cylindrical wall for receiving said streams from said inlets and a spiral lower portion for mixing said streams, said lower portion comprising four equally spaced helical blades extending outwardly from the impeller axis and having their outer edges in near wiping engagement with said housing side wall and their upper ends extending across the open bottom of said cylindrical member, said blades including a plurality of openings spaced along the lengths thereof for permitting portions of said ingredients to pass through said blades during rotation of said impeller, said bottom housing wall having a flared outlet at the center thereof, the inner portions of the lower ends of said blades being relieved to form an axially-positioned conical recess in the lower end of said impeller above said outlet opening whereby, during rotation of said impeller, portions of the mixture will flow into said recess out of the path of the remaining lower end portions of said blades as said mixture flows toward said outlet opening, said blades including extensions extending upwardly around the outer surface of said cylindrical member for removing any portions of said mixture backing up into the space between said cylindrical member and said housing.

References Cited in the file of this patent
UNITED STATES PATENTS

| | | |
|---|---|---|
| 660,185 | Franklin | Oct. 23, 1900 |
| 2,576,995 | Carvel | Dec. 4, 1951 |
| 2,680,879 | Schnuck et al. | June 15, 1954 |
| 2,857,144 | Gurley et al. | Oct. 21, 1958 |